UNITED STATES PATENT OFFICE.

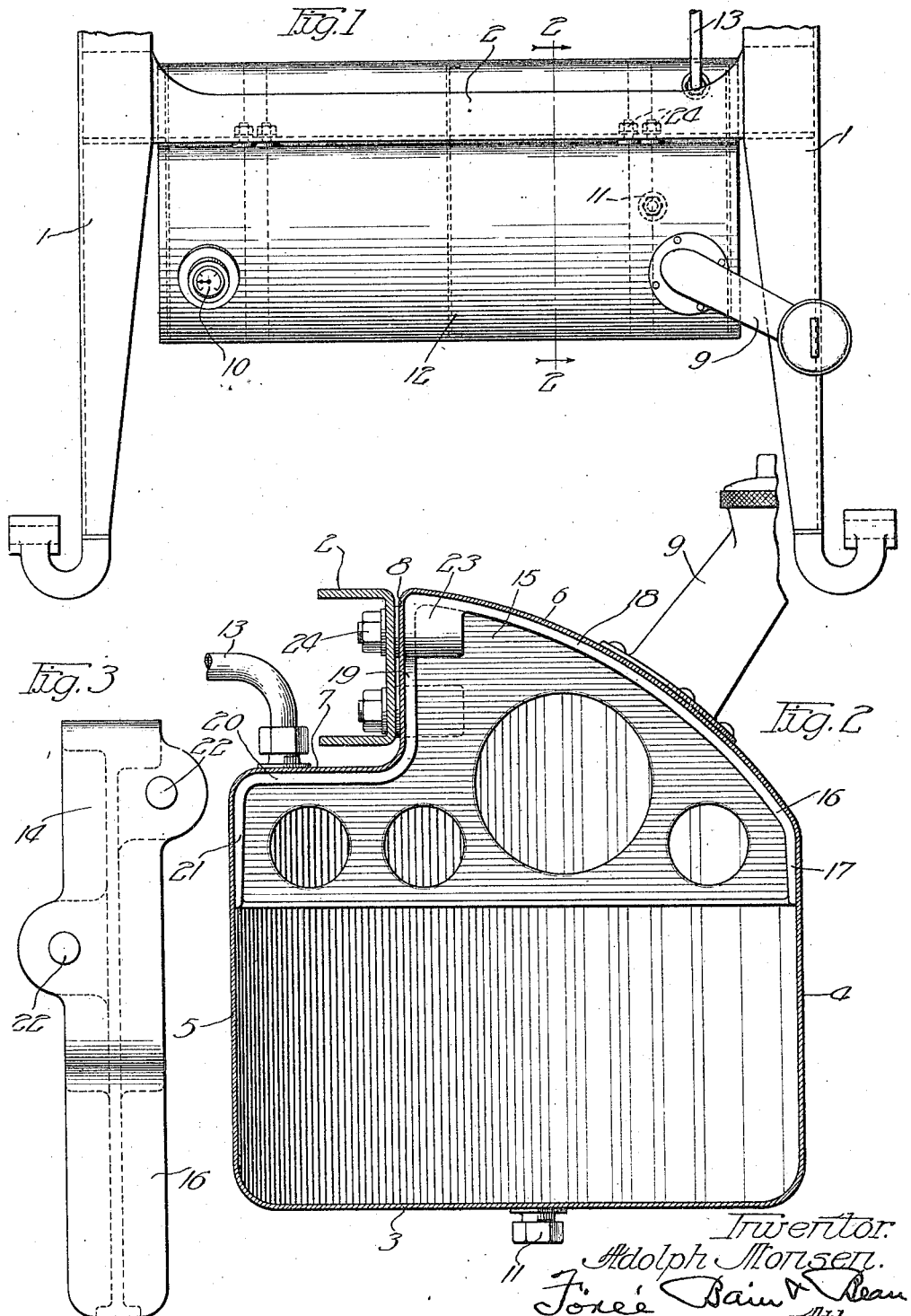

ADOLPH MONSEN, OF LOGANSPORT, INDIANA, ASSIGNOR OF ONE-HALF TO NEWTON VAN ZANDT, OF LOGANSPORT, INDIANA.

FUEL-TANK AND MEANS FOR SUPPORTING IT.

1,307,138.  Specification of Letters Patent.  Patented June 17, 1919.

Application filed July 5, 1918. Serial No. 243,379.

*To all whom it may concern:*

Be it known that I, ADOLPH MONSEN, a citizen of the United States, residing at Logansport, in the county of Cass and State of Indiana, have invented certain new and useful Improvements in Fuel-Tanks and Means for Supporting Them, of which the following is a specification.

This invention relates to a fuel tank and means for supporting the same and has reference particularly to a liquid fuel tank which is supported on the rear of an automobile or other motor vehicle.

The principal object of this invention is the provision of such a tank which is secured to and supported from one of the rear frame members of the chassis of a motor vehicle, the supporting means being made to fit the upper portion of the inside surface of the tank so as to have an extended bearing and supporting surface. The supporting means is also provided with an elongated and wide web, the whole construction being very strong and very simple and readily assembled.

To the accomplishment of the foregoing and such other objects as may hereinafter appear my invention consists in the construction, combination and arrangement of parts hereinafter described and thus sought to be defined in the appended claims, reference being had to the accompanying drawings forming a part hereof and which shows merely for the purpose of illustrative disclosure a preferred embodiment of my invention, it being expressly understood, however, that various changes may be made in practice within the scope of the claims without digressing from my inventive idea.

In the drawings:

Figure 1 represents a top plan view of the rear part of the frame of a motor vehicle with a tank, constructed according to my invention in position thereon.

Fig. 2 is a vertical transverse cross section taken substantially on line 2—2 of Fig. 1.

Fig. 3 is a detail end elevation of the supporting member or bracket.

Referring now to the drawings the numeral 1 designates the side members of the frame and chassis and the numeral 2 the rear cross or transverse member or sill, which as shown, is preferably of channel construction, but of course, this is not essential to the use of this invention. It is to this cross member 2 that the tank is attached and from which it is supported.

The tank itself is of elongated oblong shape having the bottom 3, the rear wall 4, front wall 5, and the upper rounded wall 6. Along its upper front edge, the tank is formed with an inset portion which provides the horizontal wall 7 and the vertical wall 8. It is through this vertical wall 8 that the attaching means for securing the tank to and supporting it from the cross beam or sill 2, are passed. The tank, of course, is provided with the usual accessories including the inlet nozzle 9, the gage 10, the drain 11, and the baffle plate 12, and has the pipe connection 13 leading to the motor.

The bracket or supporting member 14, by means of which I mount and support the tank from the frame, is formed with the elongated and comparatively wide web 15 and also the bearing and supporting flange 16. The lower edge of this bracket member is straight but the remainder of the edge is formed by the flange 16 and conforms in shape to the upper part of the tank. Therefore the flanged part of the bracket is provided with the short straight rear length 17, the rounded part 18, the vertical part 19, the horizontal part 20, and the front vertical part 21, so that, as shown in Fig. 2, the flange extends entirely around the inside surface of the tank and fits the same so as to afford an extended bearing and supporting surface for the tank.

The preferred means of securing this bracket to the cross beam or sill 2 is by means of the studs 22 which are secured in the enlargements 23 formed on the inside of the bracket, one on each side of the web 15, the studs 22 projecting beyond the flange 16 of the bracket and passing through the cross beam or sill 2, as clearly shown, nuts 24 or other securing means, completing the connection. These studs are screw threaded at each end to fit in the enlargements 23 and to receive the nuts 24 and are also provided with the intermediate flanges 22' which bear against the face of the tank to hold the same tightly against the vertical part 19 of the flange on the bracket 15 and thereby prevent leakage at this joint. The web 15 of the bracket is provided with the openings, as shown, to permit the flow of the fuel from side to side without too much interference.

I have shown two of the bracket members 14 in use, but it is understood that the number may be varied, as desired.

It is, therefore, obvious that I have provided a very simple and strong construction for supporting the tank from the rear end of frame of the motor vehicle and which is readily applied and assembled.

Having described my invention, what I claim is:—

1. In combination with a frame, a tank to be supported therefrom, a bracket fitting within the tank and having a bearing and supporting surface conforming to the inside surface of the upper part of the tank, and means for connecting said bracket to said frame.

2. In combination with a frame, a tank to be supported therefrom, said tank having an irregularly shaped upper part, a bracket fitting within the tank and having a bearing and supporting flange conforming to and fitting the inside surface of the upper part of the tank, and means for connecting said bracket to said frame.

3. In combination with a frame, a tank to be supported therefrom, its upper part having an inset portion to fit said frame, a bracket fitting within the tank and having a bearing and supporting surface conforming to the inside surface of the tank, including the inset portion, and means for connecting said bracket to said frame.

4. In combination with a frame, a tank having straight front and rear walls, a rounded top wall member and an inset portion along the front top edge to fit said frame, a bracket having a bearing and supporting flange conforming in shape to the inside surface of the upper portion of the tank including the upper part of the front and rear walls, the top member and the inset portion, and means for connecting said bracket to said frame.

5. In combination with a frame, a tank to be supported thereon, a bracket having a bearing and supporting flange conforming to the upper part of the inner surface of the tank, said bracket also having an elongated bracing web extending from the front wall of the tank to the rear wall thereof, and means for connecting said bracket to said frame.

6. In combination with a frame, a tank to be supported therefrom, said tank having straight front and rear walls, a rounded top member and an inset portion along the front top edge providing a vertical wall and a horizontal wall to fit said frame, a bracket having a bearing and supporting flange conforming in shape to the inside surface of the upper portion of the tank including the upper part of the front and rear wall, the top member and the inset portion, said bracket also having an elongated and wide web extending the full length thereof, and means for connecting said bracket to said frame, said means passing through the vertical wall of the inset portion of the upper part of the tank.

7. In combination with a frame having a rear transverse member, a tank to be supported therefrom, a bracket fitting within the tank and having a bearing and supporting surface conforming to part of the inside surface of the tank and means for connecting said bracket to said transverse member of the frame.

8. In combination with a frame, a tank to be supported therefrom, a bracket fitting within the tank conforming to part of the inside surface of the tank, said bracket having screw threaded enlargements and screw threaded studs each having an intermediate annular flange and passing through said tank into said enlargement and also through said frame and means for securing said stud to said frame.

9. In combination with a frame, a tank to be supported therefrom, a bracket fitting within the tank and having a bearing and supporting flange conforming to and fitting part of the inside surface of the tank, said bracket also having a plurality of screw threaded enlargements and screw threaded studs each having an intermediate annular flange and passing through a wall of the tank into said screw threaded enlargement and also passing through said frame and means for securing said studs to said frame.

10. In combination with a frame, having side members and a rear transverse member, a tank to be supported therefrom, said tank having an inset portion in its upper part to fit against said rear transverse member and beneath the same, a bracket member within the tank having part thereof positioned adjacent said inset portion of the tank, and securing means engaging said rear transverse member and said bracket.

11. In combination with a frame, including side members and a rear transverse member, a tank to be supported therefrom, a pair of bracket members positioned within the tank near each end portion thereof, said bracket member conforming in shape to part of the inside surface of said tank and means for securing each of said bracket members to said transverse member of the frame.

In testimony whereof I hereunto subscribe my name.

ADOLPH MONSEN.

Copies of this patent may be obtained for five cents each, by addressing the "Commissioner of Patents, Washington, D. C."